United States Patent [19]

Itoh et al.

[11] Patent Number: 4,694,055
[45] Date of Patent: * Sep. 15, 1987

[54] METHOD FOR THE SUSPENSION POLYMERIZATION OF VINYL CHLORIDE MONOMER

[75] Inventors: Kenichi Itoh, Clute, Tex.; Genji Noguki, Yamaguchi; Masanobu Nakahara, Ibaraki, both of Japan

[73] Assignee: Shin-Etsu Chemical Co., Ltd., Tokyo, Japan

[*] Notice: The portion of the term of this patent subsequent to Sep. 15, 2004 has been disclaimed.

[21] Appl. No.: 748,432

[22] Filed: Jun. 25, 1985

[51] Int. Cl.$^4$ ............................................. C08L 33/02
[52] U.S. Cl. ................................... 526/201; 525/246; 525/301; 526/203; 526/344.2; 526/345
[58] Field of Search ................ 526/201, 203, 344.2, 526/345; 525/246, 301

[56] References Cited

U.S. PATENT DOCUMENTS

| | | | |
|---|---|---|---|
| 2,772,258 | 11/1956 | Mangelli | 526/203 |
| 2,886,552 | 5/1959 | Heiligmann et al. | 526/201 |
| 3,488,328 | 1/1970 | Koyanagi et al. | 526/201 |
| 3,907,730 | 9/1975 | Jones | 526/201 |
| 3,966,696 | 6/1976 | Kidoh et al. | 526/201 |
| 4,228,264 | 10/1980 | Yamamoto et al. | 526/201 |
| 4,360,651 | 11/1982 | Dinbergs | 526/88 |
| 4,377,672 | 3/1983 | Geschonke et al. | 526/203 |

Primary Examiner—Joseph L. Schofer
Assistant Examiner—J. M. Reddick
Attorney, Agent, or Firm—Hopgood, Calimafde, Kalil, Blaustein & Judlowe

[57] ABSTRACT

The invention provides an improvement in the suspension polymerization of vinyl chloride or a monomer mixture mainly composed of vinyl chloride in an aqueous medium containing a nonionic surface active agent and in the presence of a monomer-soluble polymerization initiator, according to which the aqueous polymerization medium is admixed with a crosslinked copolymer having carboxyl groups such as a copolymer of acrylic acid and diethyleneglycol bisallyl or bismethallyl ether at a moment when the percentage of the monomer conversion is in the range from 1 to 20% so that a polyvinyl chloride resin product of high quality can be obtained having an outstandingly high bulk density and plasticizer absorptivity but still containing an extremely small number of fish eyes.

4 Claims, No Drawings

METHOD FOR THE SUSPENSION POLYMERIZATION OF VINYL CHLORIDE MONOMER

BACKGROUND OF THE INVENTION

The present invention relates to a method for the suspension polymerization of vinyl chloride monomer in an aqueous medium in the presence of a monomer-soluble polymerization initiator or, more particularly, the invention relates to an improvement in the suspension polymerization of vinyl chloride monomer, according to which a high quality polyvinyl chloride resin product can be obtained with an outstandingly high bulk density and extremely small number of fish eyes.

As is well known, the largest part of polyvinyl chloride products is produced with high productivity by the method of the suspension polymerization of the monomer in an aqueous polymerization medium in the presence of a monomer-soluble polymerization initiator. The polyvinyl chloride resin products are in general required to have a bulk density as high as possible from the standpoint of obtaining a high productivity or, in other words, an extrudable amount of the resin in a unit time in the fabrication of rigid shaped articles by the technique of extrusion molding.

It is well known that, in the suspension polymerization of vinyl chloride in an aquesous medium, the bulk density of the resin product is determined depending usually on the type of the dispersing agent and the condition of agitation of the polymerization mixture during the polymerization reaction. Accordingly, various proposals have been made hitherto in these respects with an object to obtain a polyvinyl chloride resin product having an increased bulk density although the prior art methods are not quite satisfactory due to the problem that the resin product obtained by the method has a decreased porosity and contains fish eyes in an increased number.

The above mentioned porosity of a polyvinyl chloride resin is another important quality factor from the standpoint of the behavior of the resin for gelation and absorptivity of plasticizers in the process of molding and it is also known that addition of a surface active agent to the polymerization mixture has an effect of increasing the porosity of the resin product. A problem in this method is, however, the decrease in the bulk density of the resin product.

Thus, a contradictory relationship exists between the increase in the bulk density and increase in the porosity of a polyvinyl chloride resin product and it has been generally understood that it is extremely difficult to obtain compatibility between these two requirements. In recent years, proposals have been made in this regard according to which the suspension polymerization of vinyl chloride is performed in an aqueous medium containing a combination of a certain water-insoluble crosslinked polymer containing carboxyl groups and a non-ionic surface active agent (see, for example, Japanese Patent Kohyo 57-500614 and 57-500650). This method is, however, not sufficiently effective in respect of the requirements for an increased porosity and decreased number of fish eyes though not quite insignificantly effective in increasing the bulk density of the polyvinyl chloride resin product. In particular, the number of fish eyes is a very important quality parameter of a polyvinyl chloride resin product to be improved by all means due to the direct adverse influences thereof on the quality of the shaped articles molded of the resin product.

SUMMARY OF THE INVENTION

An object of the present invention is therefore to provide a novel and improved method for the suspension polymerization of vinyl chloride monomer in an aqueous polymerization medium in the presence of a monomer-soluble polymerization initiator and a non-ionic surface active agent, according to which the polyvinyl chloride resin product obtained has an outstandingly high bulk density and still contains an extremely small number of fish eyes without particular adverse influences on other properities of the resin product.

Thus, the improvement provided by the invention comprises, in the method for the susupension polymerization of vinyl chloride monomer in an aqueous polymerization medium in the presence of a monomer-soluble polymerization initiator and non-ionic surface active agent, admixing the aqueous polymerization medium at a moment when the monomer conversion is in the range from 1% to 20% with a carboxyl-containing crosslinked copolymer which is typically a copolymer of acrylic acid and bisallyl or bismethallyl ether of diethyleneglycol.

Alternatively, the overall amount of the carboxyl-containing crosslinked copolymer to be added to the aqueous polymerization medium is divided into two portions and the first portion in an amount from 1 to 30% of the overall amount is added before the start of the polymerization reaction while the second portion of the remainder amount of the copolymer is added to the aqueous medium at a moment when the monomer conversion is in the range from 1 to 20%.

DETAILED DESCRIPTION OF THE PREFERRED EMBODIMENTS

It is understood that the glassy beads in a vinyl chloride-based polymeric resin responsible for fish eyes are formed as a result of the non-uniformity in the dispersion of the polymerization initiator relative to the vinyl chloride monomer at the beginning stage of the polymerization reaction. Uniformity in the dispersion of the polymerization initiator relative to the monomer can be improved by several measures including a method in which the polymerization mixture is thoroughly and vigorously agitated to effect dispersion of the initiator in the course from the introduction of the polymerization initiator into the polymerization reactor to the start of the polymerization reaction by the temperature elevation and a method in which the polymerization initiator is introduced into the polymerization reactor as dissolved in advance in the monomer. The former method of thorough agitation is, however, not always quite effective in obtaining uniform dispersion of the polymerization initiator, especially, when the aqueous medium is admixed with a dispersing agent having a high viscosity while the latter method of introducing the initiator as a solution in the monomer is disadvantageous due to the possible deposition of polymer scale on the walls of the dissolving tank, inlet piping and elsewhere. This problem of polymer scale deposition cannot be solved with fully uniform dispersion of the polymerization initiator even by taking a measure of washing down the walls with a large volume of the monomer following the introduction of the initiator to the reactor as dissolved in a small volume of the monomer.

As is described above, the very scope of the improvement consists in the admixture of the aqueous polymerization medium with a carboxyl-containing crosslinked copolymer at a specific moment relative to the percentage of the monomer conversion. Namely, the copolymer should be added to the polymerization mixture at a moment when the monomer conversion is in the range from 1% to 20%. When the whole amount of the copolymer is added at an earlier moment, i.e. before the start of the polymerization reaction or at a moment when the monomer conversion is less than 1%, glassy beads in a relatively large number are formed in the polymerization mixture so that the resultant resin product may contain a large number of fish eyes although the mechanism therefor is not well understood. When the copolymer is added to the polymerization mixture at a moment when the monomer conversion has exceeded 20%, on the other hand, coalescence of the polymer particles may take place in the polymerization mixture so that the resin product has a decreased bulk density with poor uniformity in the particle size distribution.

The carboxyl-containing crosslinked copolymer is an essential additive in the method of the present invention in order to obtain a resin product having a high bulk density and excellent dispersing or stabilizing effects are exhibited on the monomer droplets when the aqueous polymerization medium contains the copolymer so that an advantage is obtained that the resin product has a uniform particle configuration.

The carboxyl-containing crosslinked copolymer can be prepared by the crosslinking copolymerization of a polymerizable carboxylic acid compound and a crosslinking agent which is a compound having at least two polymerizable groups $CH_2=C<$. Exemplary of suitable crosslinking agents are: divinyl benzene; divinyl naphthalene; soluble polymerized dienes, e.g. polybutadiene; ethyleneglycol diacrylate; ethyleneglycol dimethacrylate; allyl acrylate; methylene bisacrylamide; divinyl ether; diallyl ether and polyvinyl or polyallyl derivatives of pentaerithritol, mannitol, sorbitol, glucose, saccharose and the like as well as polyoxyalkylene compounds of the general formula

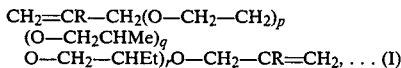
$$CH_2=CR-CH_2(O-CH_2-CH_2)_p$$
$$(O-CH_2CHMe)_q$$
$$O-CH_2-CHEt)_rO-CH_2-CR=CH_2, \ldots \text{(I)}$$

in which Me is a methyl group, Et is an ethyl group, R is a hydrogen atom or a methyl group and p, q and r are each zero or a positive integer with the proviso that $p+q+r$ is a positive integer not exceeding 500. Each of the syffixes p, q and r is zero or a positive integer by definition but it can be a number with a fraction as an average value.

Exemplary of the crosslinking agent represented by the general formula (I) above are: diethyleneglycol bisallyl ether, i.e. a compound of the formula (I) in which R is a hydrogen atom, $p=2$, $q=0$ and $r=0$; diethyleneglycol bismethallyl ether, i.e. a compound of the formula (I) in which R is a methyl group, $p=2$, $q=0$ and $r=0$; a compound of the formula (I) in which R is a methyl group, $p=4.5$ on an average, $q=0$ and $r=0$; a compound of the formula (I) in which R is a hydrogen atom, $p=8$, $q=2.6$ on an average and $r=0$; a compound of the fromula (I) in which R is a hydrogen atom, $p=0$, $q=17$ and $r=0$; and a compound of the formula (I) in which R is a methyl group, $p=0$, $q=2.6$ on an average and $r=0$. These crosslinking agents can be used either singly or as a combination of two kinds or more according to need.

The polymerizable unsaturated carboxylic acid to be copolymerized with the above described crosslinking agent is exemplified by acrylic acid, methacrylic acid, itaconic acid, chloroacrylic acid, cyanoacrylic acid, α-phenylacrylic acid, α-benzylacrylic acid, crotonic acid, maleic acid, fumaric acid, sorbic acid and the like. These polymerizable carboxylic acids can be used either singly or as a combination of two kinds or more.

The crosslinking agent is copolymerized with the unsaturated carboxylic acid compound in an amount from 0.05 to 10 parts by weight or, preferably, from 0.1 to 5 parts by weight per 100 parts by weight of the unsaturated carboxylic acid. When the amount of the crosslinking agent is smaller than above, the degree of crosslinking in the resultant copolymer is too small so that the desired effect is obtained only in an insufficient extent while an excessively large amount of the crosslinking agent gives an excessively crosslinked copolymer having little effect as a dispersing agent.

The crosslinking copolymerization of the unsaturated carboxylic acid and the crosslinking agent can be performed in an organic solvent such as benzene, toluene, n-hexane, ethyl acetate and the like in the presence of a polymerization initiator which can be an azo compound, an organic or inorganic peroxide or a redox-type catalyst system including, for example, azobisisobutyronitrile, 2,2'-azobis(2,4-dimethyl-4-methoxy valeronitrile), benzoyl peroxide, tertbutyl hydroperoxide, inorganic persulfates, combinations of a persulfate and a percarbonate, combinations of a persulfate and a sulfite and the like.

Exemplary of the non-ionic surface active agent to be contained in the aqueous polymerization medium are: polyoxyethylene alkyl ethers; polyoxyethylene alkyl phenyl ethers; polyoxyethylene-polyoxypropylene block copolymers; partial esters of glycerin with a fatty acid; partial esters of sorbitan with a fatty acid; partial esters of pentaerithritol with a fatty acid; monoesters of propyleneglycol with a fatty acid; partial esters of saccharose with a fatty acid; partial esters of polyoxyethylene sorbitan with a fatty acid; partial esters of polyoxyethylene sorbitol with a fatty acid; partial esters of polyoxyethylene glycerin with a fatty acid; fatty acid esters of polyethyleneglycol; partial esters of polyglycerin with a fatty acid; polyoxyethylene adducts of castor oil; fatty acid diethanolamides; N,N-bis(2-hydroxyalkyl) amines; polyoxyethylene alkylamides; fatty acid esters of triethanolamine; trialkylamine oxides; and the like. These surface active agents can be used either singly or as a combination of two kinds or more according to need.

In practicing the method of the present invention, the polymerization reaction of vinyl chloride monomer is performed in an aqueous polymerization medium containing the above mentioned non-ionic surface active agent and the crosslinked copolymer is introduced into the polymerization mixture at a moment when the percentage of the monomer conversion is in the specified range. The amounts of the surface active agent and the crosslinked copolymer should be in the ranges from 0.005 to 1 part by weight or, preferably, from 0.01 to 0.5 part by weight and from 0.01 to 2 parts by weight or, preferably, from 0.02 to 0.5 part by weight, respectively, per 100 parts by weight of the monomer or monomer mixture dispersed in the polymerization medium.

Although the essential scope of the inventive method is in the addition of the crosslinked copolymer to the polymerization mixture at a moment when the monomer conversion is in the range from 1 to 20%, it is optional that a small portion, i.e. from 1 to 30% or, preferably, from 1 to 20% of the overall amount of the crosslinked copolymer to be added is introduced into the polymerization mixture before the start of the polymerization and the remainder, i.e. from 99 to 70% or, preferably, from 99 to 80% of the overall amount thereof is introduced into the polymerization mixture at the moment when the monomer conversion is in the above specified range.

The polymerization reaction according to the method of the present invention is carried out by use of a monomer-soluble polymerization initiator which is exemplified by organic peroxide compounds including diisopropyl peroxy dicarbonate. di-2-ethylhexyl peroxide, tert-butyl peroxy pivalate, benzoyl peroxide and lauroyl peroxide and azo compounds such as azobisisobutyronitrile, azobis-2,4-dimethyl valeronitrile and azobis-2,4-dimethoxy-2,4-dimethyl valeronitrile.

The method of the invention is applied to the suspension polymerization of vinyl chloride monomer but is also applicable to the suspension copolymerization of a monomer mixture mainly composed of vinyl chloride monomer with one or more of copolymerizable monomers provided that the content of vinyl chloride in the monomer mixture is, for examples, 50% by weight or more. The monomers copolymerizable with vinyl chloride in the inventive method include vinyl esters, e.g. vinyl acetate, vinyl ethers, acrylic and methacrylic acids as well as esters thereof, acrylic and fumaric acids and esters thereof, maleic anhydride, aromatic vinyl compounds, e.g. styrene, unsaturated nitrile compounds, e.g. acrylonitrile, vinylidene halides, e,g, vinylidene fluoride and vinylidene chloride, olefins, e.g. ethylene and propylene, and others.

The recipe of the polymerization mixture, e,g, the amount of the polymerization initiator to be added, and the conditions of the polymerization reaction, e.g. temperature and duration of the polymerization reaction, may be generally conventional as in the prior art method for the suspension polymerization of vinyl chloride with no particular limitations.

The advantages obtained by the inventive method are not limited to the above mentioned decrease in the number of fish eyes in the polyvinyl chloride resin product but an additional advantage is obtained that the amount of the deposition of polymer scale is decreased on the inner walls of the polymerization reactor and the surfaces of the stirrer and the like coming into contact with the monomer during the polymerization reaction. This advantage of the decreased polymer scale deposition can be further increased by the addition of a water-soluble basic compound into the aqueous polymerization medium in an amount of 0.1% by weight or smaller based on the amount of the monomer or monomers in the polymerization mixture.

In the following, the method of the invention is illustrated in more detail by way of examples and comparative Examples.

EXAMPLES 1 AND 2 AND COMPARATIVE EXAMPLES 1 AND 2

In each of the Examples, into a stainless steel-made polymerization reactor of 100 liter capacity were introduced 60 kg of deionized water, 30 g of poly(20)oxyethylene sorbitan monooleate as a non-ionic surface active agent and 20 g of di-2-ethylhexyl peroxy dicarbonate and, after evacuation of the polymerization reactor to exclude the atmospheric oxygen, 30 kg of vinyl chloride monomer were further introduced into the polymerization reactor to form a polymerization mixture which was heated to 57° C. under agitation to start the polymerization reaction.

When the percentage of the monomer conversion had reached 2% or 15%, 6 liters of a 0.5% by weight aqueous solution of the crosslinked copolymer I indicated below were added to the polymerization mixture and the polymerization was further continued.

Crosslinked copolymer I: a crosslinked copolymer prepared from 100 parts by weight of acrylic acid and 1 part by weight of diethyleneglycol bisallyl ether When the pressure inside the polymerization reactor had dropped to 6.0 kg/cm$^2$G, the polymerization reaction was terminated followed by the recovery of the unreacted monomer and the polymerizate slurry was discharged out of the reactor, dehydrated and dried to give a polyvinyl chloride resin product.

The resin products were subjected to the test of the bulk density, plasticizer absorption and number of fish eyes to give the results shown in Table 1. The procedures for the determination of the plasticizer absorption and number of fish eyes were as follows.

Plasticizer (DOP) absorption: 10 g of the resin were admixed with 20 g of DOP (dioctyl phthalate) and, after standing for 1 hour at room temperature, the mixture was subjected to centrifugal separation to remove the unabsorbed DOP and to calculate the amount of the DOP absorbed in the resin in % by weight.

Number of fish eyes: 50 g of the resin were admixed with 25 g of DOP, 0.3 g of tribasic lead sulfate, 1.0 g of stearic acid and 0.005 g of carbon black and, after standing for 30 minutes, the mixture was milled on a roll at 140° C. for 7 minutes and taken out of the roll in the form of a sheet of 0.2 mm thickness, of which the number of translucent particles on a 100 cm$^2$ area was counted as the fish eyes.

As is shown in Table 1, the resin products obtained in Examples 1 and 2 were each of a high quality and had a bulk density of 0.53 g/ml or larger with a sufficiently large value of plasticizer absorption and extremely small number of fish eyes. On the contrary, the resin obtained in Comparative Example 1 was of a poor quality in respect of the plasticizer absorption and number of fish eyes though with a high bulk density and the resin obtained in Comparative Example 2 had a low bulk density though with a large plasticizer absorption and small number of fish eyes.

EXAMPLE 3 TO 5

The experimental conditions in each of these Examples were substantially the same as in the preceding examples excepting the replacement of the crosslinked copolymer I with one of the crosslinked copolymers II, III and IV indicated below. The results of the experiments are shown in Table 1.

Crosslinked copolymer II: a crosslinked copolymer prepared from 100 parts by weight of acrylic acid and 2 parts by weight of diethyleneglycol bismethallyl ether Crosslinked copolymer III: a crosslinked copolymer prepared from 100 parts by weight of acrylic acid and 2 parts by weight of diethyleneglycol bisallyl ether Crosslinked copolymer IV: a crosslinked copolymer prepared from 100 parts by weight of acrylic acid and 3 parts by weight of diethyleneglycol bisallyl ether

TABLE 1

|  | Crosslinked copolymer | Monomer conversion, %* | Bulk density, g/ml | Plasticizer absorption, % | Fish eyes, pieces/100 cm² |
| --- | --- | --- | --- | --- | --- |
| Example 1 | I | 2 | 0.55 | 25.0 | 3 |
| Example 2 | I | 15 | 0.53 | 26.0 | 2 |
| Comparative Example 1 | I | 0 | 0.53 | 20.0 | 340 |
| Comparative Example 2 | I | 25 | 0.46 | 27.0 | 2 |
| Example 3 | II | 2 | 0.54 | 25.0 | 2 |
| Example 4 | III | 2 | 0.56 | 24.0 | 10 |
| Example 5 | IV | 2 | 0.57 | 23.0 | 15 |
| Example 6 | V | 2 | 0.53 | 23.0 | 35 |
| Example 7 | VI | 2 | 0.53 | 24.0 | 40 |
| Comparative Example 3 | V | 0 | 0.54 | 20.0 | 150 |

*Percentage at the moment of addition of the crosslinked copolymer

EXAMPLES 6 AND 7

The experimental conditions in each of these Examples were substantially the same as in Example 1 excepting the replacement of the crosslinked copolymer I with the crosslinked copolymer V or VI indicated below. The results of the experiments are shown in Table 1.

Crosslinked copolymer V: a crosslinked copolymer prepared from 100 parts by weight of acrylic acid and 0.3 part by weight of allyl pentaerithritol Crosslinked copolymer VI: a crosslinked copolymer prepared from 100 parts by weight of acrylic acid and 1.3 parts by weight of an allyl saccharose monomer

COMPARATIVE EXAMPLE 3

Into the same polymerization reactor as used in Example 1 were introduced 60 kg of deionized water, 30 kg of Tween 80 as a non-ionic surface active agent and 30 g of the crosslinked copolymer V used in Example 6 under agitation and the reactor was evacuated. Thereafter, 30 kg of vinyl chloride monomer containing 20 g of di-2-ethylhexyl peroxy dicarbonate dissolved therein were introduced into the polymerization reactor to form a polymerization mixture which was heated to 57° C. to effect the polymerization reaction.

The polymerizate slurry was processed into a dry resin product and subjected to the tests in the same manner as in Example 1 to give the results shown in Table 1. In this case, a bulky deposition of polymer scale was found on the lower end of the nozzle through which the vinyl chloride monomer containing the polymerization initiator was introduced. Polymer scale deposition was found also on the inner walls of the piping.

EXAMPLES 8 AND 9

The conditions of the polymerization reaction were substantially the same as in Example 1 except that the overall amount 30 g or 39 g of the crosslinked copolymer I in Examples 8 and 9, respectively, was divided into two portions each dissolved in water and the first portion was added to the polymerization mixture before the start of the polymerization reaction and the second portion was added at a moment when the monomer conversion was 2% or 15% in Example 8 or 9, respectively, as is indicated in Table 2 below. The results of the tests for the properties of the resin products are shown in the same table.

TABLE 2

| Example No. | Crosslinked copolymer I First portion, g | Crosslinked copolymer I Second portion, g | Bulk density, g/ml | Plasticizer absorption, % | Fish eyes, pieces/100 cm² |
| --- | --- | --- | --- | --- | --- |
| 8 | 3 | 27 | 0.58 | 23.0 | 2 |
| 9 | 9 | 30 | 0.56 | 25.0 | 3 |

EXAMPLE 10

The procedure of the polymerization reaction was about the same as in Example 9 above except that the amounts of the deionized water and vinyl chloride monomer in the initial charge were decreased to 54 kg and increased to 36 kg, respectively, and the crosslinked copolymer I was added to the polymerization mixture firstly before the start of the polymerization reaction and secondly at a moment when the monomer conversion was 15% in amounts of 10.8 g and 36.0 g, respectively. The results were that the resin product had a bulk density of 0.58 g/ml and plasticizer absorption of 24.0% and the number of fish eyes was 3 pieces/100 cm².

What is claimed is:

1. In a method for the suspension polymerization of vinyl chloride monomer or a monomer mixture mainly composed of vinyl chloride in an aqueous polymerization medium containing a non-ionic surface active agent and in the presence of a monomer-soluble polymerizatin initiator, an improvement which comprises admixing the aqueous polymerization medium with a water-soluble cross-linked copolymer having carboxyl groups at a moment when the percentage of the monomer conversion is in the range from 1 to 20%, wherein the water-soluble cross-linked copolymer having carboxyl groups is a copolymer of 100 parts by weight of acrylic acid and from 0.05 to 10 parts by weight of diethyleneglycol bisallyl or bismethallyl ether.

2. The improvement as claimed in claim 1 wherein the amount of the water-soluble cross-linked copolymer having carboxyl groups is in the range from 0.01 to 2 parts by weight per 100 parts by weight of the vinyl chloride monomer or the monomer mixture mainly composed of vinyl chloride.

3. The improvement as claimed in claim 1 which further comprises admixing the aqueous polymerization medium with a first portion of the water-soluble crosslinked copolymer having carboxyl groups prior to the start of the polymerization reaction, the amount of the said first portion of the copolymer being in the range from 1 to 30% of the overall amount of the copolymer of the first portion and the portion added at a moment when the percentage of the monomer conversion is in the range from 1 to 20%.

4. The improvement as claimed in claim 3 wherein the overall amount of the water-soluble cross-linked copolymer having carboxyl groups is in the range from 0.01 to 2 parts by weight per 100 parts by weight of the vinyl chloride monomer or the monomer mixture mainly composed of vinyl chloride.

* * * * *